UNITED STATES PATENT OFFICE.

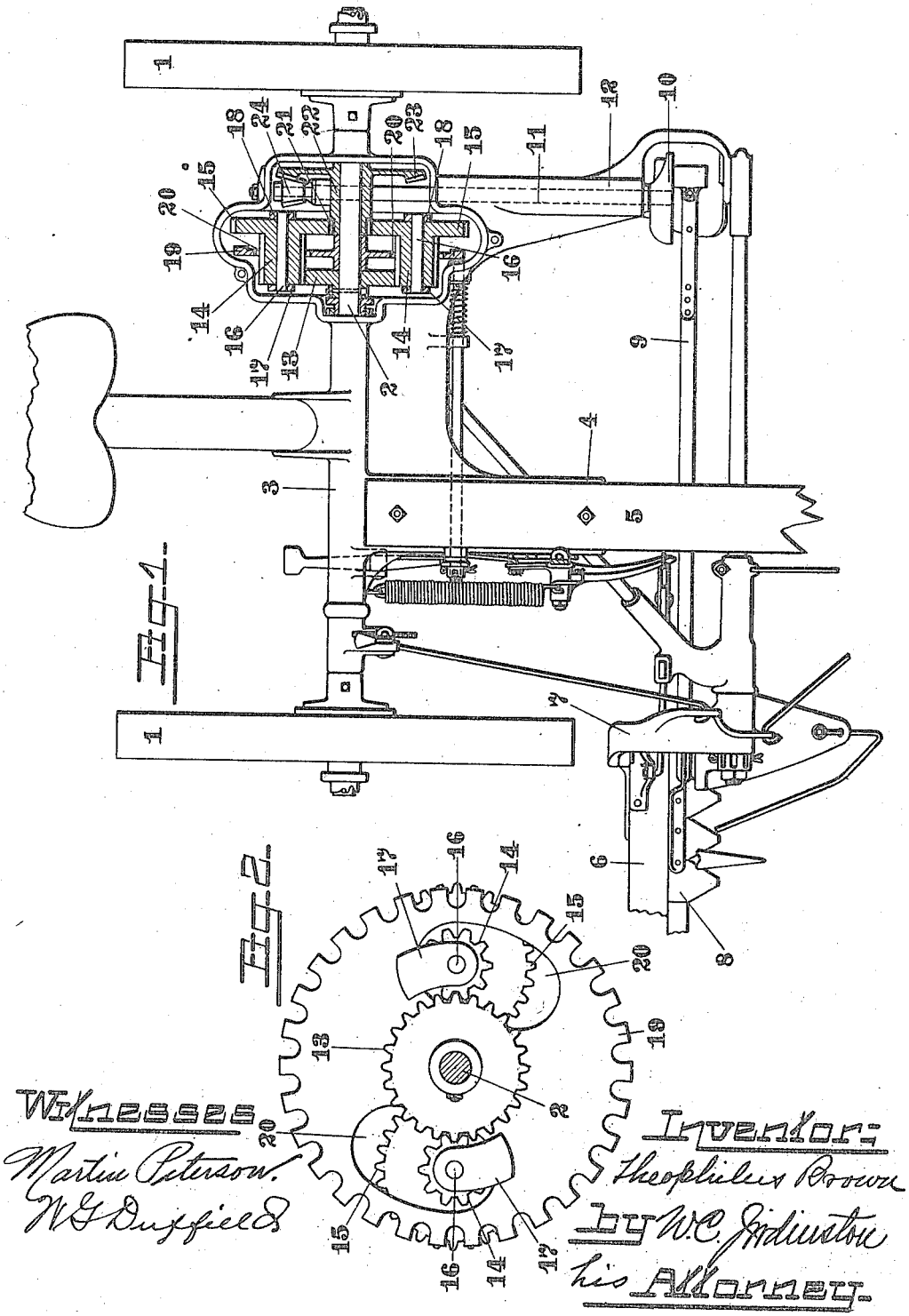

THEOPHILUS BROWN, OF MOLINE, ILLINOIS, ASSIGNOR TO DEERE & COMPANY, OF MOLINE, ILLINOIS, A CORPORATION OF ILLINOIS.

MOWING-MACHINE.

1,270,490. Specification of Letters Patent. Patented June 25, 1918.

Application filed October 12, 1914, Serial No. 866,346. Renewed May 17, 1918. Serial No. 235,056.

*To all whom it may concern:*

Be it known that I, THEOPHILUS BROWN, a citizen of the United States, residing at Moline, in the county of Rock Island and State of Illinois, have invented certain new and useful Improvements in Mowing-Machines, of which the following is a specification, reference being had therein to the accompanying drawing.

My invention relates to mowing machines, and more particularly to the gearing employed to transmit power from the supporting wheels to the cutting mechanism, and the means by which the gearing is rendered active or inactive at will.

Referring to the drawings in which similar numerals indicate identical parts—

Figure 1 is a plan view of a mower embodying my improvements and with gearing shown in section. Fig. 2 is a detail enlarged of a gear supporting member and connected gearing mounted on the axle.

My invention is an improvement on the type of gearing for mowing machines as covered by my pending application filed December 11, 1913, to which reference is made.

Supporting wheels 1 are mounted on an axle 2 and are secured thereon in a manner well known in the art, so that the axle 2 will revolve with the wheels when the machine is moving in a forward direction only. The axle 2 is journaled in a tubular portion 3 of a frame which has a forward extension 4 to which is secured a pole or tongue 5. The cutter consists of a usual form of cutter bar 6 secured to a yoke 7, and a knife 8, the latter when in operation being reciprocated by a pitman 9 secured to the knife head and to a crank 10 secured on a crank-shaft 11 journaled in a tubular extension 12 of the frame.

Permanently secured on the axle 2 and revoluble therewith is a driving spur gear 13 in constant mesh with pinions 14; the pinions 14 are preferably integral with secondary driving gears 15 journaled on stub shafts 16, the latter supported in bracket arms 17 and 18 projecting on opposite faces of a member 19, loosely mounted on the axle 2, the pinions 14 extending through openings 20 in the member 19; the bracket arms 17 and 18 are approximately equidistant from the faces of the member 19 so that strain thereon, while the gearing is transmitting power from the axle to the cutter, is equalized.

The gears 15 are also in constant mesh with a pinion 21 preferably integral with the hub 22 of a bevel gear 23 mounted loosely on the axle 2; the bevel gear 23 meshes with a bevel pinion 24 rigidly secured on the crank shaft 11 in any suitable manner and revoluble therewith, the bevel gear 23 engaging with the bevel pinion on the stubbleward side thereof.

The member 19 has in its periphery a series of equidistant notches with any one of which a stop is adapted to engage.

The spur gear 13 being permanently secured to the axle 2 when the latter revolves power is transmitted to the secondary driving gears 15 through the pinions 14, and if the member 15 is locked against movement the power of the wheels is transmitted through the gears 15 to the bevel gear 23 by reason of the pinion 21 thereon meshing with the gears 15, the bevel gear 23 actuating the bevel pinion 24 to operate the crank shaft 11 to reciprocate the cutter; to render the cutter inoperative I release the stop which holds the member 15, consequently the latter will be free to revolve and no power will be transmitted from the wheels 1 through the axle 2 and the gear 13.

What I claim is—

1. In a mower, the combination of an axle having supporting wheels with which it revolves in a forward direction, a cutter, a crank shaft, a train of power transmitting devices supported on the axle in constant engagement with each other and with the crank shaft and adapted to actuate the latter to operate the cutter by power from the ground wheels when one of said devices is held against rotation around the axle, said train comprising a bevel gear loosely mounted on the axle, a bevel pinion on the crank shaft and in permanent mesh with the bevel gear, a spur gear rigidly secured on the axle and rotatable constantly therewith, a notched member loosely mounted on the axle, gearing supported on said member in continuous mesh with the spur gear, and a stop operable at will to engage with a notch in said member to hold the latter immovable while the cutter is in operation.

2. In a mower, the combination of an axle having supporting wheels with which it revolves in a forward direction, a cutter, a crank shaft, a train of power transmitting devices supported on the axle in constant engagement with each other and with the crank shaft and adapted to actuate the latter to operate the cutter by power from the ground wheels when one of said devices is held against rotation around the axle, said train comprising a bevel gear loosely mounted on the axle, a bevel pinion on the crank shaft and in permanent mesh with the bevel gear, a spur gear rigidly secured on the axle and rotatable constantly therewith, a circular member loosely mounted on the axle, gearing supported on said member in continuous mesh with the spur gear and a pinion on the bevel gear and adapted to transmit power from the spur gear to the bevel gear to actuate the crank shaft and operate the cutter when the circular member is held immovable, notches in the periphery of said member, and a stop to engage therewith at will and adapted to be disengaged therefrom to prevent operation of the cutter.

In testimony whereof I affix my signature, in presence of two witnesses.

THEOPHILUS BROWN.

Witnesses:
W. H. McMAHIN,
LLOYD HUMBERSTONE.

Copies of this patent may be obtained for five cents each, by addressing the "Commissioner of Patents, Washington, D. C."